United States Patent [19]

Watanabe et al.

[11] Patent Number: 5,006,623

[45] Date of Patent: * Apr. 9, 1991

[54] PROCESS FOR PREPARING VINYL CHLORIDE COPOLYMERS WITH DIACRYLATE OF POLYHYDRIC ALCOHOL

[75] Inventors: Junichi Watanabe, Ageo; Tohru Yokota, Ibaraki, both of Japan

[73] Assignee: Shin-Etsu Chemical Co., Ltd., Tokyo, Japan

[*] Notice: The portion of the term of this patent subsequent to Mar. 28, 2006 has been disclaimed.

[21] Appl. No.: 362,256

[22] Filed: Jun. 6, 1989

[30] Foreign Application Priority Data

Jun. 9, 1988 [JP] Japan ................................ 63-142459

[51] Int. Cl.⁵ ......................... C08F 2/20; C08F 220/20
[52] U.S. Cl. .................................. 526/320; 524/569; 526/202; 526/323.2
[58] Field of Search ............... 526/199, 200, 202, 201, 526/320, 323.2

[56] References Cited

U.S. PATENT DOCUMENTS 4,816,539 3/1989 Watanabe ........................... 526/320

*Primary Examiner*—Christopher Henderson
*Attorney, Agent, or Firm*—McAulay Fisher Nissen Goldberg & Kiel

[57] ABSTRACT

A process for preparing a vinyl chloride copolymer which comprises polymerizing a vinyl chloride monomer or a mixture of a major proportion of a vinyl chloride monomer with a minor proportion of a copolymerizable monomer and at least one crosslinking agent selected from polyhydric alcohol diglycidyl ether diacrylates and dimethacrylates. The crosslinking agent is added to the reaction system after polymerization of the vinyl chloride monomer or the mixture proceeds to a certain extent. By this, the resultant copolymer has good processability and good mechanical and electric characteristics.

7 Claims, No Drawings

PROCESS FOR PREPARING VINYL CHLORIDE COPOLYMERS WITH DIACRYLATE OF POLYHYDRIC ALCOHOL

BACKGROUND OF THE INVENTION

1. Field of the Invention

This invention relates to a process for preparing vinyl chloride copolymers capable of forming polyvinyl chloride moldings wherein the vinyl chloride copolymers have good workability and the molding articles have good matte properties on the article surface, good compression set, good resistances to creep and heat and good electric characteristics.

2. Description of the Prior Art

Thermoplastic elastomer compositions mainly composed of vinyl chloride resin have better formability (forming processability) than other compositions, e.g. rubbers, in that they can be formed easily by extrusion or injection. However, they are disadvantageous in that the resultant moldings have poor compression set and poor creep resistance with poor matte properties of the molding surface.

One of known techniques of overcoming the disadvantage is a method wherein the vinyl chloride resin is made higher in degree of polymerization, for which a crosslinkable monomer is added upon polymerization of vinyl chloride to increase an apparent degree of polymerization. However, this method is not advantageous in that the forming workability becomes considerably worsened with an attendant problem that expected physical properties develop only when using a specific type of processing machine or a specific type of technique.

SUMMARY OF THE INVENTION

It is accordingly an object of the present invention to provide a process for preparing a vinyl chloride copolymer which overcomes the disadvantages of the known processes.

It is another object of the present invention to provide a process for efficiently preparing a vinyl chloride copolymer which has good forming processability and from which polyvinyl chloride moldings are obtained as having good surface matte properties, good mechanical characteristics such as compression set, creep resistance and the like, a good heat resistance, and good electric characteristics.

We have already proposed a process of preparing a vinyl chloride copolymer in Japanese patent application Laid-open No. 63-154713 or U.S. patent application Ser. No. 133,502 now U.S. Pat. No. 4,816,539. The process comprises polymerizing a vinyl chloride monomer or a mixture of a major proportion of a vinyl chloride monomer with a minor proportion of a copolymerizable monomer and at least one crosslinkable monomer or crosslinking agent selected from polyhydric alcohol diglycidyl ether diacrylates and dimethacrylates of the following general formula,

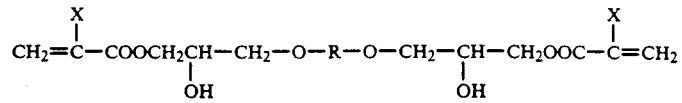

wherein R represents an alkylene group having from 2 to 8 carbon atoms or a group of the formula,

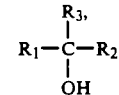

wherein $R_1$ and $R_2$ independently represent an alkylene group having from 1 to 6 carbon atoms and $R_3$ represents a hydrogen atom or an alkyl group having from 1 to 6 carbon atoms, and X represents a hydrogen atom or a methyl group.

However, we have found that when the crosslinkable monomer is added in such a way that it is added in all amounts prior to polymerization and then, the polymerization is started or it is added in all amounts at an initial stage of the polymerization, the polymerization reaction of the crosslinkable monomer proceeds rapidly. Thus, the uniform reaction between the crosslinkable monomer and vinyl chloride monomer does not proceed as expected. This leads to the problem that fish eyes are liable to be produced. For similar reasons, there are produced further problems that the reaction efficiency in obtaining the copolymer of the vinyl chloride monomer and the crosslinkable monomer relative to the amount of the crosslinkable monomer is poor and that the crosslinkable monomer which is more expensive than the vinyl chloride monomer which is more expensive than the vinyl chloride monomer has to be used in large amounts with poor economy.

As the result of investigating an improved process, we have found that if the crosslinking agent is added after polymerization of the vinyl chloride monomer has proceeded to an extent, the copolymerization proceeds efficiently and the resultant copolymer can be conveniently formed by ordinary molding or forming techniques such as extrusion or injection molding without impeding forming processability. In addition, the molded articles have a good appearance with a matted surface and a reduced number of fish eyes. Moreover, the molded articles have good mechanical characteristics such as a compression set, a creep resistance and the like, a good heat resistance and good electric characteristics. The vinyl chloride copolymer is adapted for use in various fields of wire coating, parts of automobiles, various packings, hoses and the like.

Therefore the present invention provides a process for preparing a vinyl chloride copolymer which comprises polymerizing a vinyl chloride monomer or a mixture of a major proportion of a vinyl chloride monomer with a minor proportion of a copolymerizable monomer and at least one crosslinking agent selected from polyhydric alcohol diglycidyl ether diacrylates and dimethacrylates of the following general formula,

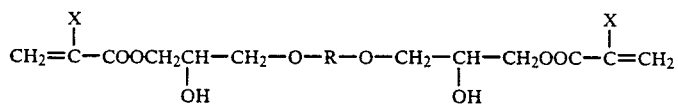

wherein R represents an alkylene group having from 2 to 8 carbon atoms or a group of the formula,

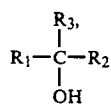

wherein $R_1$ and $R_2$ independently represent an alkylene group having from 1 to 6 carbon atoms and $R_3$ represents a hydrogen atom or an alkyl group having from 1 to 6 carbon atoms, and X represents a hydrogen atom or a methyl group, said at least one crosslinking agent being added to the reaction system for copolymerization with the vinyl chloride or the mixture when the polymerization of said vinyl chloride or said mixture proceeds to a rate of from 3 to 90%.

The above and other objects, features and advantages of the present invention will be more apparent from the following description.

DETAILED DESCRIPTION OF THE INVENTION

In the process for preparing vinyl chloride copolymers according to the present invention, a vinyl chloride monomer alone or in combination with a copolymerizable monomer is used as a starting material.

If mixed, the content of the vinyl chloride monomer should preferably be 50% by weight or over, more preferably 70% by weight or over. The co-monomers to be copolymerized with vinyl chloride includes, for example, vinyl esters such as vinyl acetate, vinyl propionate and the like, acrylic or methacrylic esters such as methyl acrylate, ethyl acrylate and the like, olefins such as ethylene, propylene and the like, other copolymerizable monomers such as maleic anhydride, acrylonitrile, styrene, vinylidene chloride and the like, and mixtures thereof.

In the practice of the invention, the vinyl chloride starting material is polymerized in coexistence of at least one member selected from polyhydric alcohol diglycidyl ether diacrylates and dimethacrylates of the following general formula,

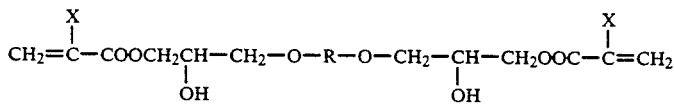

wherein R represents an alkylene group having from 2 to 8 carbon atoms, preferably from 2 to 5 carbon atoms, or a group of the formula,

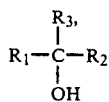

wherein $R_1$ and $R_2$ independently represent an alkylene group having from 1 to 6 carbon atoms, preferably from 1 to 3 carbon atoms, $R_3$ represents a hydrogen atom or an alkyl group having from 1 to 6 carbon atoms, preferably from 1 to 3 carbon atoms, and X represents a hydrogen atom or a methyl group.

The polyhydric alcohol diglycidyl ether diacrylates or methacrylates are prepared by reacting polyhydric alcohols with epichlorohydrin to obtain polyhydric alcohol diglycidyl ethers and further reacting the ethers with acrylic acid or methacrylic acid. Preferable examples of the polyhydric alcohols include dihydric alcohols such as ethylene glycol, propylene glycol, butandiol, pentandiol, hexandiol and the like, and trihydric alcohols such as glycerine, butantriol, pentantriol, hexantriol, pentamethylglycerine and the like. Of these, glycerine is more preferred. The crosslinking agent of the general formula (1) is most preferably glycerine diglycidyl ether diacrylate or glycerine diglycidyl ether dimethacrylate.

When these polyhydric alcohol glycidyl ether diacrylate or methacrylates are used as the crosslinking agent, they should preferably be preliminarily subjected to extraction treatment with water. By the treatment with water, the catalyst used for the preparation of the compound and impurities such as by-products are removed. The vinyl chloride copolymer obtained by the use of the water-extracted agent has better electric characteristics such as volume resistivity. The water extraction treatment procedure may not be limited to any specific one provided that intended impurities are removed. For instance, pure water is charged into a container equipped with an agitator in an amount of 10 to 200% based on polyhydric alcohol glycidyl ether diacrylates or methacrylates to be treated. The mixture is agitated at a temperature of a normal temperature or about 20° C. to about 80° C., preferably from about 30° C. to about 60° C., at which the compound is not hydrolyzed, for 5 to 120 minutes. The thus agitated mixture is allowed to stand for 10 minutes to 5 hours thereby permitting it to separate into two phases, from which the aqueous phase is removed.

In the process of the invention, when the crosslinking agent of the formula (1) is reacted with the vinyl chloride starting material, the agent has to be added after polymerization of the vinyl chloride monomer to an extent. By this, the polymerization proceeds in an efficient manner and the resultant copolymer has a reduced number of fish eyes. The addition of the agent to the reaction system should preferably be made at the time when the polymerization reaction rate of the monomers other than the crosslinking agent reaches 3 to 90%, preferably 5 to 80%, more preferably 5 to 60%.

When the agent is added at a state where the polymerization reaction rate of the monomer is lower than 3%, formation of particles are not complete, so that the polymerization of the crosslinking agent alone proceeds initially with a poor reaction efficiency with the possibility that fish eyes are produced. On the other hand when the crosslinking agent is added at the time when the polymerization reaction efficiency exceeds 90%, the copolymer component of the crosslinking agent and the vinyl chloride monomer is reduced in amount, so that the compression set, creep resistance and heat resistance may not be improved.

The after-addition may be made by adding all amounts of the total feed at a stretch, or by continuously adding a given amount of the total feed little by little. It also be made by dividing a given amount of the total feed into two to about thirty portions and then adding the portions at a given interval.

The amount of the crosslinking agent depends upon the type and purpose of intended vinyl chloride copolymer and is thus not limited. In general, the amount is from 0.1 to 10% by weight based on the vinyl chloride starting material. Preferably, the crosslinking agent is used such that the insoluble content of the resultant vinyl chloride copolymer in tetrahydrofuran (THF) is in the range of from 1 to 50% by weight, more preferably from 5 to 30% by weight. If the THF insoluble content is less than 1%, the matte properties, creep resistance and heat resistance may not be improved satisfactorily. Over 50%, a further improvement of these characteristics is not expected and the processability may lower in some case.

In the practice of the invention, the copolymerization technique may be any vinyl chloride polymerization techniques ordinarily adopted in the art. In general, a suspension polymerization process using an oil-soluble radical initiator and a dispersing agent in an aqueous medium is appropriate.

In the case, the radical initiator may be ones which are conventionally used for the suspension polymerization and include, for example, percarbonates such as diisopropyl peroxydicarbonate, di-2-ethylhexyl peroxydicarbonate, diethoxyethyl peroxydicarbonate and the like, per-esters such as t-butyl peroxyneodecanate, α-cumyl peroxyneodecanate, 2,4,4-trimethylpentyl peroxy-2-neodecanate and the like, peroxides such as acetylcyclohexylsulfonyl peroxide, 2,4,4-trimethylpentyl-2-peroxyphenoxy acetate and the like, azo compounds such as azobis-2,4-dimethylvaleronitrile, azobis(4-methoxy-2,4-dimethylvaleronitrile) and the like. These compounds may be used singly or in combination.

The dispersing agent may be water-soluble cellulose, ethers such as methyl cellulose, hydroxyethyl cellulose, hydroxypropyl cellulose, hydroxypropylmethyl cellulose and the like, water-soluble polymers such as partially saponified polyvinyl alcohol, acrylic acid polymers, gelatin and the like, oil-soluble emulsifiers such as sorbitan monolaurate, sorbitan trioleate, glycerine tristearate, ethylene oxide/propylene oxide block copolymers and the like, and water-soluble emulsifiers such as polyoxyethylene sorbitan monolaurate, polyoxyethylene glycerine oleate, sodium laurate and the like. These may be used singly or in combination.

The radical initiator may be used in an amount of from about 0.005% to about 3% by weight based on the vinyl chloride starting material.

The dispersing agent may be used in an amount of from about 0.001% to about 5% by weight based on the vinyl chloride starting material.

If necessary, polymerization regulators, chain transfer agents, polymerization inhibitors, gelling improvers, antistatic agents and pH controlling agents ordinarily used for the polymerization of vinyl chloride may be used.

The polymerization conditions are not critical and ordinarily employing conditions are used. In this connection, however, when the polymerization temperature is lower than 20° C., the reaction time becomes long with poor productivity. Over 80° C., the resultant vinyl chloride polymers may lower in creep and heat resistances. Hence, the temperature is preferably from 20° to 80° C.

The vinyl chloride copolymers obtained by the process may be mixed, if necessary, with additives such as plasticizers, stabilizers, lubricants, fillers and pigments to obtain resin compositions. Since the resin composition contains the vinyl chloride copolymer as a main ingredient, it has good processability and is capable of yielding moldings which have good matte properties on the surface thereof, good mechanical properties such as compression set, creep resistance and the like, good heat resistance and good electric characteristics. Accordingly, the composition is conveniently used as various high performance wire coatings, automobile parts, various packings, high-quality hoses and the like because of its good resistances to heat, migration and solder.

The plasticizers useful for the above purpose may be alkyl esters of aromatic polybasic acids such as dibutyl phthalate, dioctyl phthalate, butylbenzyl phthalate and the like, alkyl esters of aliphatic polybasic acids such as dioctyl azelate, dioctyl sebacate and the like, and alkyl esters of phosphoric acid such as tricresyl phosphate and the like. These plasticizers may be used singly or in combination. The amount is appropriately determined depending on the type of molding and is generally in the range of 0 to 200 parts by weight, more preferably 0 to 150 parts by weight, per 100 parts by weight of the vinyl chloride copolymer.

When the resin compositions is formed or molded, any ordinary molding methods including extrusion and injection molding techniques may be used wherein ordinary molding conditions are employed.

As will become apparent from the above, according to the process of the invention, there is efficiently obtained a vinyl chloride copolymer which has good formability and is capable of yielding polyvinyl chloride moldings having good matte properties, mechanical properties such as compression set and creep resistance, heat resistance and electric characteristics.

The present invention is more particularly described by way of examples, which should not be construed as limiting the invention. Comparative examples are also shown.

EXAMPLES 1, 2 AND COMPARATIVE EXAMPLES 1 to 3

60 liters of water, 30 g of partially saponified polyvinyl alcohol, 30 kg of vinyl chloride monomer and 24 g of di-2-ethylhexyl peroxydicarbonate were charged into an autoclave with an inner capacity of 100 liters and polymerization was started at 42° C., after which crosslinking agents indicated in Table 1 were, respectively, added at reaction rates indicated in Table 1. When the reaction rate reached 80%, the reaction was stopped. After recovery of unreacted vinyl chloride, the reaction system was dehydrated and dried to obtain copolymers.

The insoluble matter content of the respective copolymers in tetrahydrofran (THF) was determined according to the following procedure.

The respective vinyl chloride copolymers obtained by the above procedure were used to make resin compositions having the following formulation and subjected to measurements of processability, matte characteristic property, compression set, volume resistivity, and fish eyes according to the following procedures.

| Vinyl chloride copolymer | 100 parts by weight |
|---|---|
| Trimethyl trimellitate | 80 |
| Lead tribasic stearate | 3 |
| Lead stearate | 1 |
| Calcium carbonate | 10 |

PROCEDURE OF MEASURING INSOLUBLE MATTER CONTENT IN THF 1 g of the copolymer was placed in a 100 ml color comparison tube, to which 80 ml of THF was added and shaken at normal temperatures. Thereafter, the color comparison tube was placed on a hot water bath at 75° to 85° C. and shaken for 5 minutes, followed by cooling down to normal temperatures. THF was further added to the color comparison tube to a marking of 100 ml and was again well shaken. Subsequently, the color comparison tube was allowed to stand for one day and the resultant supernatant liquid was collected by means of a 10 ml pipette. The THF was removed by drying from the liquid and a weight of the resin component was accurately weighed (Wg), from which the THF insoluble matter content was calculated according to the following equation.

$$\text{THF insoluble matter content (\%)} = (1 - W) \times 100$$

PROCESSABILITY

Each resin composition was charged between 6 inch-diameter rolls with a surface temperature of 190° C. and a time before the compositions was wound about the roll surface was measured to evaluate forming processability from this roll winding time. A shorter time indicates better forming processability.

MATTE CHARACTERISTIC PROPERTY

After evaluation of the processability, the compositions was roll milled for 10 minutes and the resultant sheet surface was visually observed for evaluation of the matte state with the following four ranks.

⊚: uniform surface with a complete loss of luster
○: slightly non-uniform surface with a loss of luster
△: slightly uniform surface with uneven luster
X: substantial luster

COMPRESSION SET

The rolled sheet after the above evaluation was pressed at 190° C. to obtain a pressed sheet. This sheet was subjected to measurement of compression set according to the method prescribed in JIS K 6301 under conditions of 70° C., 22 hours and a compression to 25%.

VOLUME RESISTIVITY

A pressed sheet as used in the measurement of the compression set was used and subjected to measurement of volume resistivity according to the method prescribed in JIS K 6723.

MEASUREMENT OF FISH EYES 100 parts by weight of each vinyl chloride resin obtained by the polymerization, 50 parts by weight of a plasticizer (DOP), 0.1 part by weight of barium stearate, 0.1 part by weight of cadmium stearate, 0.8 parts by weight of cetanol, 2.0 parts by weight of a tin stabilizer, 0.5 parts by weight of titanium dioxide and 0.1 part by weight of carbon black were mixed together and kneaded by the use of 6 inch-diameter rolls of 140° C. for 5 minutes to obtain a 0.3 mm thick sheet. The number of white transparent particles in 100 cm² of the sheet was counted.

TABLE 1

|  | Example 1 | Example 2 | Comp. Ex. 1 | Comp. Ex. 2 | Comp. Ex. 3 |
|---|---|---|---|---|---|
| Crosslinking Agent: |  |  |  |  |  |
| Type | glycerine diglycidyl ether diacrylate | ethylene glycol diglycidyl ether dimethacrylate | diallyl phthalate | ethylene glycol diglycidyl ether dimethacrylate | — |
| Amount (wt % based on monomer) | 3.5 | 3.5 | 0.25 | 3.5 | — |
| Time of Addition of Crosslinking Agent (reaction rate %) | 20–30% (continuous feed) | 10–40% (continuous feed) | 20–30% (continuous feed) | 0% | — |
| THF Insoluble Matter Content (wt %) | 21 | 20 | 28 | 16 | — |
| Roll Winding Time (sec.) | 49 | 54 | 140 | 53 | — |
| Matte Property | ⊚ | ⊚ | ○ | ○ | X |
| Compression Set (%) | 49 | 49 | 51 | 50 | 59 |
| Volume Resistivity (Ω · cm) | $3.4 \times 10^{13}$ | $2.6 \times 10^{13}$ | $4.6 \times 10^{14}$ | $2.5 \times 10^{13}$ | $8.2 \times 10^{14}$ |
| Fish Eyes (/100 cm²) | 2 | 3 | 2 | 10 | — |

EXAMPLE 3

The procedure of Example 1 was repeated except that the crosslinking agent used was glycerine diglycidyl ether diacrylate which had been subjected to extraction treatment with water by adding 50 wt % of pure water, agitated at 50° C. for 10 minutes, allowed to stand for 3 hours for separation into two phases and removal of the supernatant liquid, and repeating the separation and removal procedure three times, thereby obtaining a vinyl chloride copolymer. The copolymer was evaluated with the results shown in Table 2 below.

TABLE 2

|  | Example 3 |
|---|---|
| Time of Addition of Crosslinking Agent (reaction rate %) | 20–30% (continuous feed) |

TABLE 2-continued

|  | Example 3 |
| --- | --- |
| THF Insoluble Matter Content (wt %) | 20 |
| Roll Winding Time (sec.) | 50 |
| Matte Property | 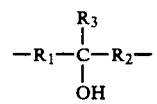 |
| Compression Set (%) | 48 |
| Volume Resistivity (Ω · cm) | $4.0 \times 10^{14}$ |
| Fish Eyes (/100 cm²) | 2 |

As will be apparent from the results of Tables 1 and 2, the vinyl chloride copolymers obtained by adding polyhydric alcohol diglycidyl ether diacrylates or methacrylates as a crosslinking agent after a certain reaction rate of the vinyl chloride monomer have a small number of fish eyes and satisfactory characteristic properties including processability, matte property, compression set and volume resistivity. When the polyhydric alcohol diglycidyl ether diacrylate is extraction treatment with water, the volume resistivity is improved.

What is claimed is:

1. A process for producing a vinyl chloride copolymer which comprises copolymerizing a suspension of vinyl chloride monomer or a monomer mixture composed of more than 50% by weight of vinyl chloride monomer and a copolymerizable monomer as the starting material in an aqueous suspension containing an oil-soluble radical initiator and a dispersing agent with from 0.1 to 10 percent by weight based on the weight of the starting material of a crosslinking agent selected from the group consisting of polyhydric alcohol diglycidyl ether diacrylates and dimethacrylates having the formula

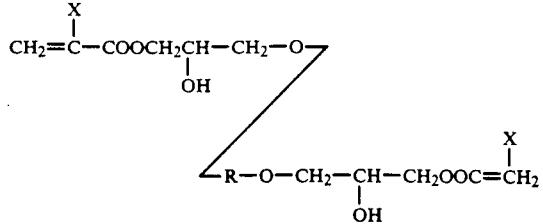

wherein R is an alkylene group having 2 to 8 carbon atoms or a group presented by the following formula $$-R_1-\underset{\underset{OH}{|}}{\overset{\overset{R_3}{|}}{C}}-R_2-$$

wherein $R_1$ and $R_2$ each denote an alkylene group having 1 to 6 carbon atoms and $R_3$ denotes a hydrogen atom or alkyl group having 1 to 6 carbon atoms; and X denotes hydrogen atom or methyl group, said crosslinking agent being added to the reaction system for copolymerization with the vinyl chloride mixture when the polymerization of said vinyl chloride or said mixture proceeds to a rate of from 10 to 40%.

2. The process according to claim 1, wherein said at least one crosslinking agent is used in an amount of from 0.1 to 10% by weight based on the weight of the vinyl chloride or the mixture.

3. The process according to claim 1, wherein said polyhydric alcohol glycidyl ether diacrylate or dimethacrylate is used after extraction treatment with water.

4. The process according to claim 1, wherein the polyhydric alcohol glycidyl ether diacrylate is glycerine diglycidyl ether diacrylate.

5. The process according to claim 1, wherein the polyhydric alcohol glycidyl ether dimethacrylate is glycerine glycidyl ether dimethacrylate.

6. The process according to claim 1, wherein a plasticizer is added in an amount of from 0 to 200 parts by weight per 100 parts by weight of the final vinyl chloride copolymer.

7. The process according to claim 1, wherein said crosslinking agent selected from the polyhydric alcohol diacrylates and dimethacrylates is previously treated with water and the water-treated crosslinking agent is added to the reaction system for copolymerization.

* * * * *